United States Patent Office.

WILLIAM PARKINSON, OF BOSTON, MASSACHUSETTS, ASSIGNOR TO WM. SEWALL WHITNEY, OF SAME PLACE.

LUBRICANT.

SPECIFICATION forming part of Letters Patent No. 252,696, dated January 24, 1882.

Application filed December 13, 1880. (Specimens.)

*To all whom it may concern:*

Be it known that I, WILLIAM PARKINSON, of the city of Boston, Suffolk county, State of Massachusetts, resident and citizen of the United States, have invented a new and Improved Lubricant, of which the following is a specification.

The nature of my invention is that of a combination of certain gums and their solvents with oils and black lead or graphite, and the object is the production of a lubricant unaffected by the application of fresh or salt water, or by atmospheric causes, and useful both on wooden and metallic surfaces.

I take (to describe the process of producing my composition from its beginning) any vegetable gum insoluble in water and dissolve it in its appropriate menstruum. I prefer to use gum-copal of any variety, heating it and adding linseed-oil. I sometimes use gum-kauri or gum-dammar. I then add linseed or any other animal or vegetable oil, as porgee, colza, rape, or cotton seed oil, preferring vegetable oils, in the proportion of one gallon of linseed-oil to eight pounds of the gum used. I use a less proportion of the other oils, diminishing the proportion of oil in a direct ratio to its lesser specific gravity. I sometimes use varnish prepared by varnish-manufacturers in their ordinary manner, adding the oils, so as to have the same proportion of oil as above indicated, having regard to what quantity may have been used as a solvent to the gum. It is preferable to heat the compound, after adding the last dose of oil, to make a perfect admixture. I then, still keeping the gum and oil sufficiently heated to be entirely fluid, mix with them finely-pulverized black lead or graphite, in the proportion of four pounds of the black lead to twelve pounds of the oil and gum, or thereabout, stirring the whole mass carefully, that the admixture may be thorough. I prefer to submit the graphite to levigation, that all silicious particles may be separated. The whole is then allowed to cool, the stirring being kept up while the cooling progresses, to prevent the subsidence of the graphite. On being cooled the whole mass is found to be a magma, or of a pasty consistence. I then thin it still further by adding oil or spirits of turpentine till it is of the consistency of ordinary house-paint, and it is then ready for use. When unusually heavy articles are to be lubricated I add less of the oil or more of the graphite or the gum.

The mode of application for use is to put it on with a moderately-stiff brush. I apply my compound to either metallic or wooden surfaces, to carriage and cart wheel hubs, to railroad-car wheels, to all heavy machinery, to window-sash frames of houses and railroad-cars, to hay-presses, to jack-stays of yachts; also, to lubricate the bottoms of racing and other boats to accelerate their speed, one peculiarity of my compound being that it will bear exposure to salt or brackish water as well as to fresh, and another that it will adhere to wood as well as metal.

I disclaim gum-resins and graphite by themselves, or oils and graphite by themselves, also gum-resins and graphite in combination with any other substance than animal or vegetable oils, and oils and graphite in combination with any other substance than gum-resins.

I claim—

A lubricating composition composed of gum-resins, animal or vegetable oils, and pulverized black lead, compounded in the manner and substantially in the proportions described.

WILLIAM PARKINSON.

Witnesses:
- LEMUEL P. JENKS,
- WM. S. WHITNEY.